United States Patent
Chen

(10) Patent No.: US 10,968,935 B2
(45) Date of Patent: Apr. 6, 2021

(54) METHOD FOR MOUNTING FASTENING STRUCTURE OF AUTOMOBILE SUNSHADE

(71) Applicant: SHYU FUU INDUSTRIAL CO., LTD., Tainan (TW)

(72) Inventor: Tung-Hsin Chen, Tainan (TW)

(73) Assignee: SHYU FUU INDUSTRIAL CO., LTD., Tainan (TW)

(*) Notice: Subject to any disclaimer, the term of this patent is extended or adjusted under 35 U.S.C. 154(b) by 338 days.

(21) Appl. No.: 16/238,248

(22) Filed: Jan. 2, 2019

(65) Prior Publication Data

US 2020/0208665 A1 Jul. 2, 2020

(51) Int. Cl.
*F16B 11/00* (2006.01)
*C09J 5/02* (2006.01)
*B60J 1/20* (2006.01)

(52) U.S. Cl.
CPC .......... *F16B 11/006* (2013.01); *B60J 1/2011* (2013.01); *C09J 5/02* (2013.01)

(58) Field of Classification Search
CPC .......... F16B 11/006; B60J 1/2011; C09J 5/02
See application file for complete search history.

(56) References Cited

U.S. PATENT DOCUMENTS

| | | |
|---|---|---|
| 7,131,683 B1 | 11/2006 | Gong |
| 8,365,799 B2 | 2/2013 | Harris |
| 2018/0184978 A1* | 7/2018 | Lo .................. A61B 5/0015 |

* cited by examiner

Primary Examiner — Jeffry H Aftergut
Assistant Examiner — Jaeyun Lee
(74) Attorney, Agent, or Firm — Muncy, Geissler, Olds & Lowe, P.C.

(57) ABSTRACT

A method for mounting fastening structure of automobile sunshade includes providing a fixing strip by stacking a first release layer with a torn portion, an adhesion layer, and a second release layer in turn; tearing off the torn portion to form a reserved opening exposing adhesion layer; providing a positioning unit, adhering the positioning unit to adhesion layer in the reserved opening temporarily and adjusting relative position between the automobile sunshade and the positioning unit; detaching the positioning unit, and exposing a sticking layer the adhesion layer after removing the second release layer to adhere to internal window frame; spreading a crosslinking agent to the adhesion layer in the reserved opening; tearing off the first release layer and adhesion layer; adhering the positioning unit to crosslinking agent on internal window frame.

10 Claims, 11 Drawing Sheets

```
                                                                         ┌─ A
  ┌───────────────────────────────────────────────────────────────┐
  │ providing at least one fixing strip, wherein said at least one fixing │
  │ strip is formed by stacking a first release layer, an adhesion layer, │
  │ and a second release layer in turn, said first release layer have a   │
  │ torn portion, and said adhesion layer is provided on one side thereof │
  │ along said second release layer with a sticking layer                 │
  └───────────────────────────────────────────────────────────────┘
                                  ↓
  ┌───────────────────────────────────────────────────────────────┐ ─ B
  │ tearing off said torn portion of said first release layer to form a reserved │
  │ opening exposing said adhesion layer                                          │
  └───────────────────────────────────────────────────────────────┘
                                  ↓
  ┌───────────────────────────────────────────────────────────────┐
  │ providing at least one positioning unit located at said internal window │
  │ frame, wherein said positioning unit have a main body towards the       │
  │ reserved opening in a corresponding position, a double-sided tape       │
  │ located at said main body and facing one side of said internal window   │
  │ frame, a stop connected to said main body and reversely protruding       │
  │ from said internal window frame, and a positioning space located        │
  │ between said main body and said stop as well as opening up in a         │─ C
  │ direction opposite to said internal window frame to provide said        │
  │ automobile sunshade to be located thereon, adhering said main body      │
  │ of said positioning unit to said adhesion layer in said reserved opening│
  │ temporarily, and adjusting a relative position of said positioning unit │
  │ and said automobile sunshade of said internal window frame              │
  └───────────────────────────────────────────────────────────────┘
                                  ↓
  ┌───────────────────────────────────────────────────────────────┐
  │ detaching said temporarily adhered positioning unit, exposing said     │
  │ sticking layer after removing said second release layer, and then      │─ D
  │ adhering said first release layer and said adhesion layer to said internal │
  │ window frame via said sticking layer                                    │
  └───────────────────────────────────────────────────────────────┘
                                  ↓
  ┌───────────────────────────────────────────────────────────────┐ ─ E
  │ spreading a crosslinking agent to said adhesion layer in said reserved │
  │ opening                                                                 │
  └───────────────────────────────────────────────────────────────┘
                                  ↓
  ┌───────────────────────────────────────────────────────────────┐ ─ F
  │ tearing off said first release layer and said adhesion layer adhered to │
  │ said internal window frame                                              │
  └───────────────────────────────────────────────────────────────┘
                                  ↓
  ┌───────────────────────────────────────────────────────────────┐
  │ orientating said main body of said positioning unit toward said        │
  │ crosslinking agent on said internal window frame correspondingly, and  │─ G
  │ tearing off a release sheet of said double-sided tape on one side of said │
  │ main body, wherein said main body of said positioning unit is adhered  │
  │ to said crosslinking agent on said internal window frame.              │
  └───────────────────────────────────────────────────────────────┘
```

Fig.1

METHOD FOR MOUNTING FASTENING STRUCTURE OF AUTOMOBILE SUNSHADE

FIELD OF THE INVENTION

The present invention is related to a method for mounting fastening structure, particularly to a method for mounting fastening structure applied to an internal window frame having an automobile sunshade.

BACKGROUND OF THE INVENTION

Presently, the ways for connecting an automobile sunshade to a window frame on the market are substantially classified into: 1. utilization of a plurality of suction cups adsorb to the internal window frame; 2. adsorbing the automobile sunshade to the internal window frame in accordance with principles of electrostatics; 3. fastening a plurality of projections, extending from the periphery of the automobile sunshade, into notches of the window in a predetermined orientation correspondingly, such that the automobile sunshade is provided with the functions of quick positioning and convenience of removal in the practical use.

An existing automobile sunshade in the prior U.S. Pat. No. 7,131,683 is cited herein firstly, in which the sunshade is positioned by a plurality of fastening blocks adhered onto a top edge and a bottom edge of an internal window frame of an automobile, and each of the fastening blocks has an accommodated region with a lengthwise positioning space and a narrower opening, so as to cover flexible material of the sunshade to facilitate flexible insertion and positioning, as well as facilitate lifting or lowering the window without removal of the sunshade in the practical use. Moreover, the sunshade is capable to be removed by simple flexure in accordance with the flexibility of the sunshade, if intended. However, it is necessary to slightly squeeze into and/or pull out of each positioning end on the periphery of the sunshade where combined with the interior of the fastening blocks of the window, one by one, while the sunshade is being positioned onto or removing from the window, and in consequence it is slightly time-consuming during the process.

For the further improvement of the above-mentioned sunshade used for blocking sun irradiating the interior of vehicle directly so as to eliminate inconvenience existed in positioning and removing, an existing prior U.S. Pat. No. 8,365,799 cited secondly has mentioned a fastening structure of sunshade, in which the sunshade may be quickly and conveniently positioned on the internal surface of the internal window frame in the practical use, owing to a metal portion correspondingly adsorbs a plurality of magnetic elements which are covered inside the periphery of the sunshade thereof, wherein the metal portion adheres to the internal surface of the internal window frame or the interior of each of the clamping members in a corresponding orientation. In such method for mounting the sunshade, it is normal for the user to predict the adhesive position of the metal portion of each of the clamping members one by one in a manner of visual observation before adhering to the internal surface of the internal window frame. However, it is not only inconvenient to operate during the process of adhesion, but also prone to occur misalignment of the plurality of magnetic elements inside the periphery of the sunshade. If the displacement of each of the clamping member occurred upon adhesion, it would be time-consuming for repositioning and reinstallation after removal of the sunshade. Further improvement of fixing manner of mounting each clamper by adhesion via visual prediction is required.

SUMMARY OF THE INVENTION

It is the object of the present invention to provide a method for mounting fastening structure of an automobile sunshade, which is using a fixing strip to adjust the relative position of a positioning unit and an automobile sunshade of an internal window frame conveniently, and thus to complete the accurate positioning of the positioning unit as well as to position when the positioning unit and the automobile sunshade are adhered to each other.

On the basis of the above object, the present invention provides a method for mounting fastening structure of the automobile sunshade including the steps as follows:

step A: providing at least one fixing strip, the fixing strip being formed by stacking a first release layer, an adhesion layer, and a second release layer in turn, the first release layer having a torn portion, the adhesion layer being provided on one side thereof along the second release layer with a sticking layer;

step B: tearing off the torn portion of the first release layer to form a reserved opening exposing the adhesion layer;

step C: providing at least one positioning unit located at the internal window frame, the positioning unit having a main body towards the reserved opening in the corresponding position, a double-sided tape being located at the main body and facing one side of the internal window frame, a stop being connected to the main body and reversely protruding from the internal window frame, and a positioning space being located between the main body and the stop as well as opening up in the direction opposite to the internal window frame to provide the automobile sunshade to be located thereon, adhering the main body of the positioning unit to the adhesion layer in the reserved opening temporarily, and adjusting the relative position of the positioning unit and the automobile sunshade of the internal window frame;

step D: detaching the temporarily adhered positioning unit, exposing the sticking layer after removing the second release layer, and then adhering the first release layer and the adhesion layer to the internal window frame via the sticking layer;

step E: spreading a crosslinking agent to the adhesion layer under the reserved opening;

step F: tearing off the first release layer and the adhesion layer adhered to the internal window frame; and step G: orientating the main body of the positioning unit toward the crosslinking agent on the internal window frame correspondingly, and tearing off a release sheet of the double-sided tape on one side of the main body, so as to enable the main body of the positioning unit and the crosslinking agent on the internal window frame to be adhered to each other.

Further, the first release layer is provided with an upper edge, a lower edge, and two side edges respectively provided at two sides of the first release layer as well as between the upper edge and the lower edge.

Further, the upper edge is larger than or equal to the lower edge of the first release layer in width.

Further, the torn portion is provided in the middle of the first release layer, and between the upper edge, the lower edge and the side edges.

Further, the second release layer is larger than each of the first release layer and the adhesion layer respectively, in total area.

Further, the first release layer may be similar to the adhesion layer in total area and in shape.

Further, the positioning units are provided at two ends on one side of the internal window frame, respectively.

Further, the internal window frame is a magnetizable frame border, in which the positioning unit is made of ferromagnetic material so as to be joined to at least one magnetic adsorbing part on an external periphery of the automobile sunshade by magnetic attraction, in which the automobile sunshade applied to the internal window frame.

Further, the internal window frame is an unmagnetizable frame border, in which the positioning unit is made of non-ferromagnetic material, the positioning unit further including an adhesive retaining structure provided on the positioning space so as to be joined to at least one adhesive retainer on the external periphery of the automobile sunshade by bonding, in which the automobile sunshade applied to the internal window frame, the adhesive retaining structure and the adhesive retainer may be male or female adhesive retaining strip relatively.

Further, the main body and the stop of the positioning unit form 90 degrees therebetween.

The features of the present invention are characterized in that:

1. The fixing strip formed by stacking the first release layer, the adhesion layer, and the second release layer in turn, as well as two existing problems of inconvenient operation and oblique attachment, caused by visual observation to predict the adhesive position before adhesion, are solved. Moreover, the relative position of the positioning unit and the automobile sunshade of the internal window frame are adjusted by the fixing strip conveniently, and thus to complete the accurate positioning of the positioning unit as well as to position when the positioning unit and the automobile sunshade are adhered to each other, in order to avoid misalignment during adhesion. Therefore, the automobile sunshade is allowed for covering the windowpane above the door completely, which is not only saving time and effort, but also effectively enhancing the quality of adhesion. Further, the yield rate of product is increased.

2. The main body and the stop of the positioning unit are located on the internal window frame in the present invention. A supporting force for stopping the automobile sunshade against the internal window frame may be provided by the stop, when the automobile sunshade is acted by external wind force, so that the automobile sunshade is prevented from falling off due to action of wind force, and then the automobile sunshade is allowed to be provided on the internal window frame stably.

3. According to the configuration of the fixing strip and the position unit provided by the invention, the positioning unit may be adhered on the magnetizable or unmagnetizable internal window frame. Moreover, the automobile sunshade of the present invention is allowed for covering the windowpane above the door completely, so as to achieve a superior shading effect.

BRIEF DESCRIPTION OF THE DRAWINGS

FIG. 1 is a flow chart of a method for mounting fastening structure of automobile sunshade of the present invention.

DETAILED DESCRIPTION OF THE PREFERRED EMBODIMENTS

Figure 2:
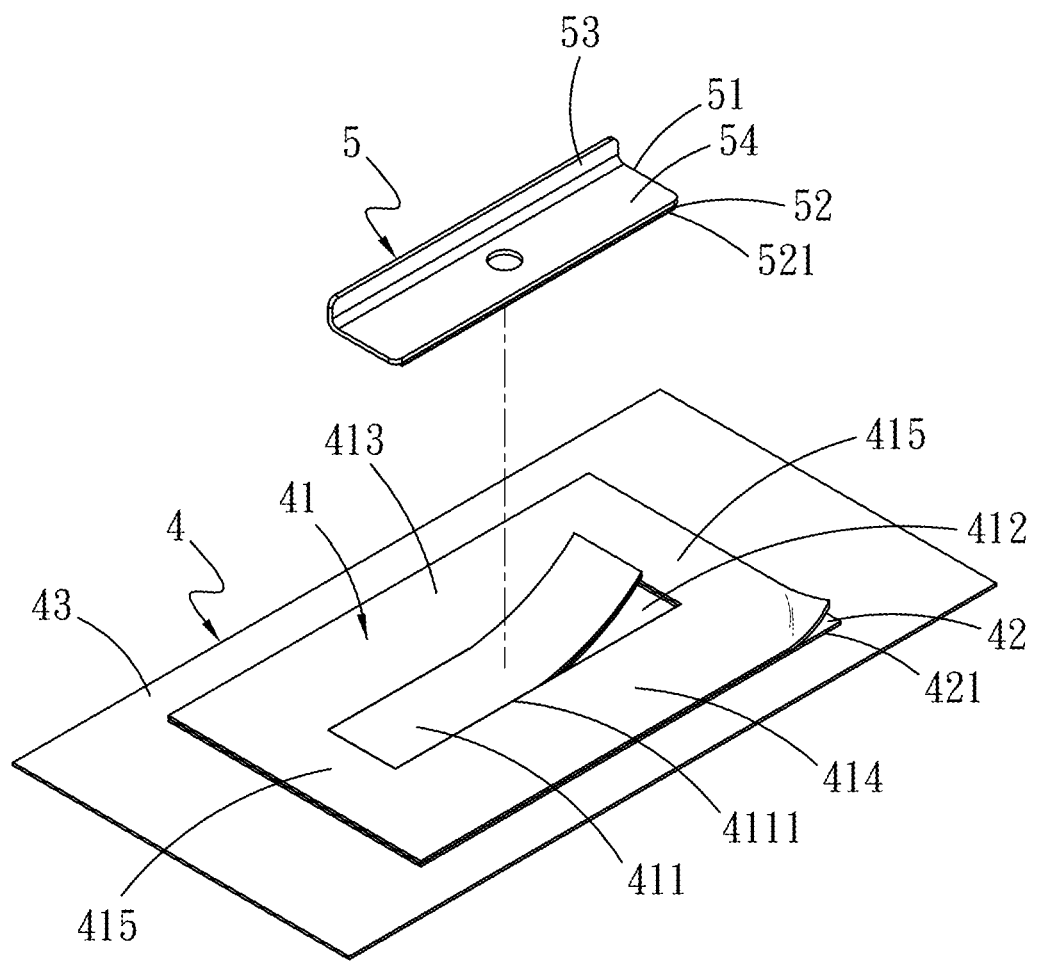
FIG. 2 is an exploded perspective view of a fastening structure of automobile sunshade of the present invention.

Referring to FIGS. 1, 2, 3A, 3B, 3C, 3D, 3E, 3F and G, a method for mounting fastening structure of automobile sunshade 1 of the present invention is described step by step, so as to complete a fastening structure, which is convenient for alignment, mounted to an internal window frame 2 and provided for an automobile sunshade 3.

Figure 3A:
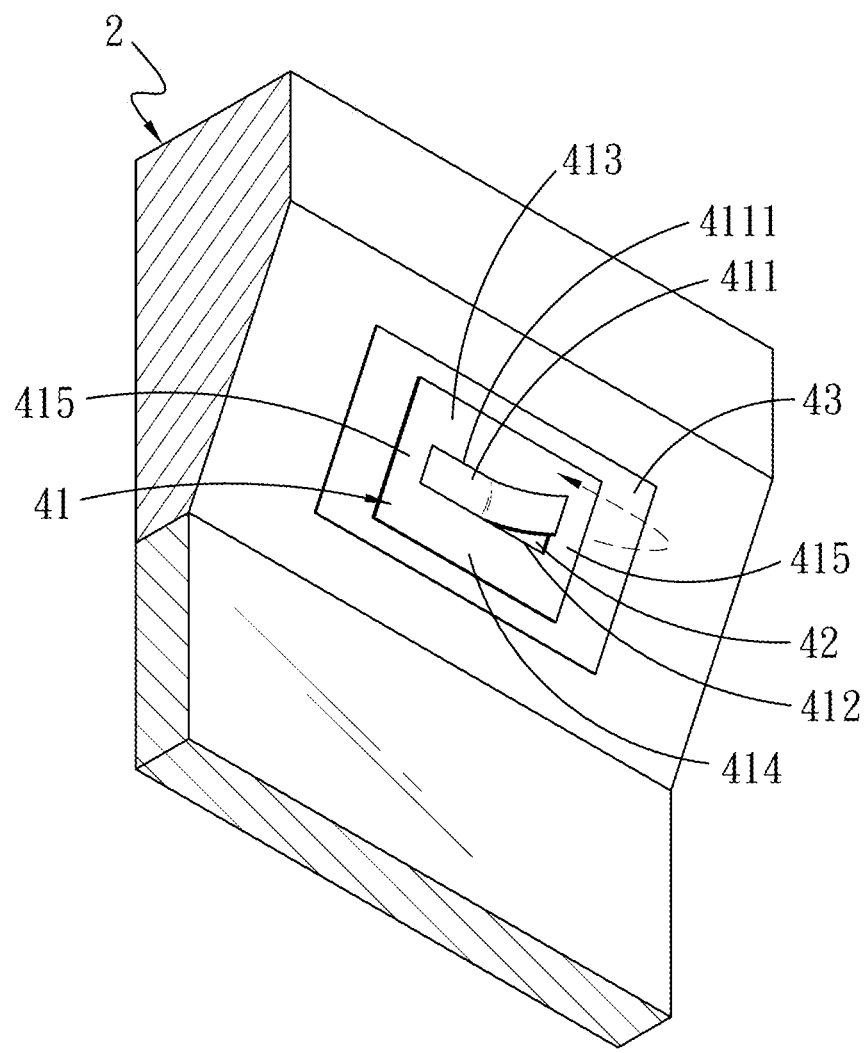
FIG. 3A is a diagram (1) of the mounting of the fastening structure of automobile sunshade of the present invention.
Figure 3B:
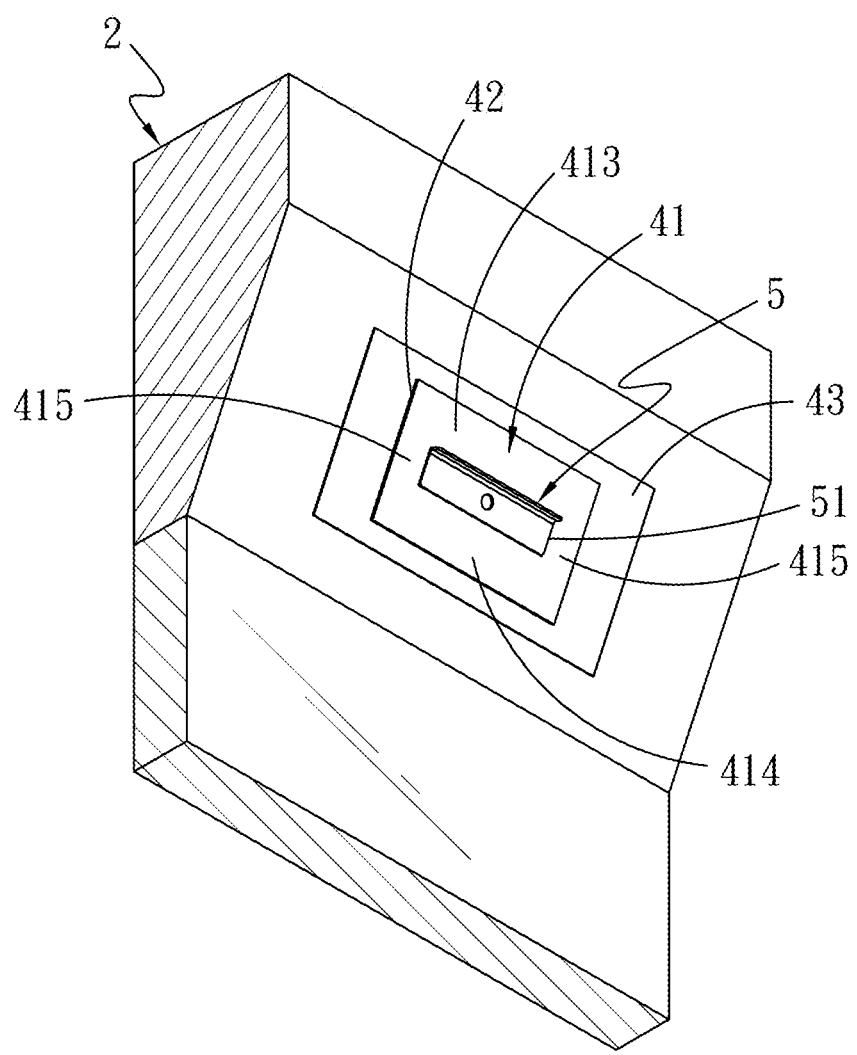
FIG. 3B is a diagram (2) of the mounting of the fastening structure of automobile sunshade of the present invention.
Figure 3C:
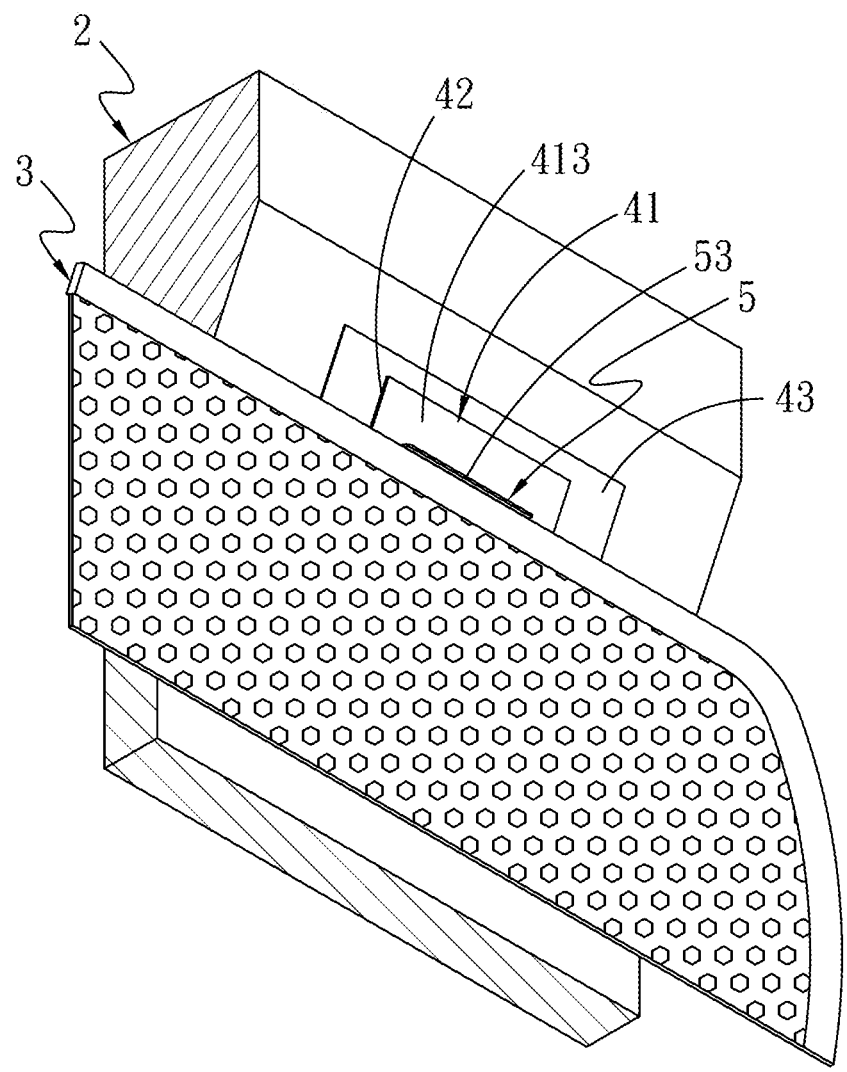
FIG. 3C is a diagram (3) of the mounting of the fastening structure of automobile sunshade of the present invention.
Figure 3D:
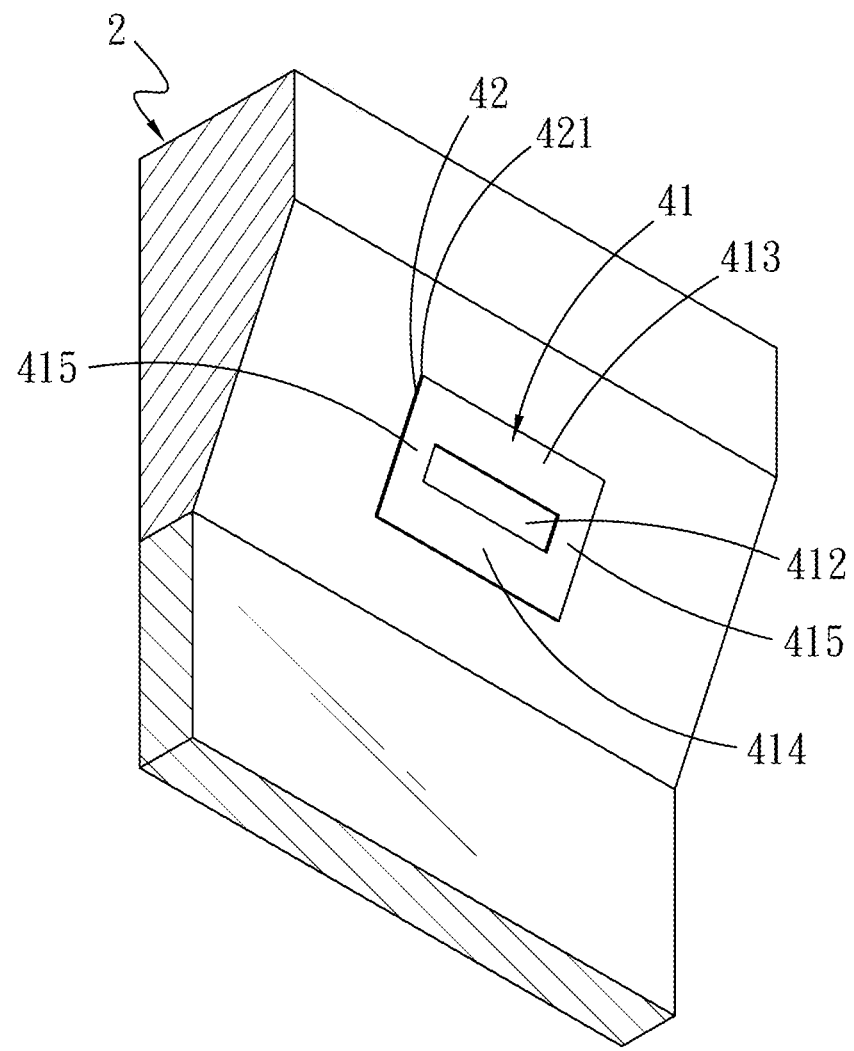
FIG. 3D is a diagram (4) of the mounting of the fastening structure of automobile sunshade of the present invention.
Figure 3E:
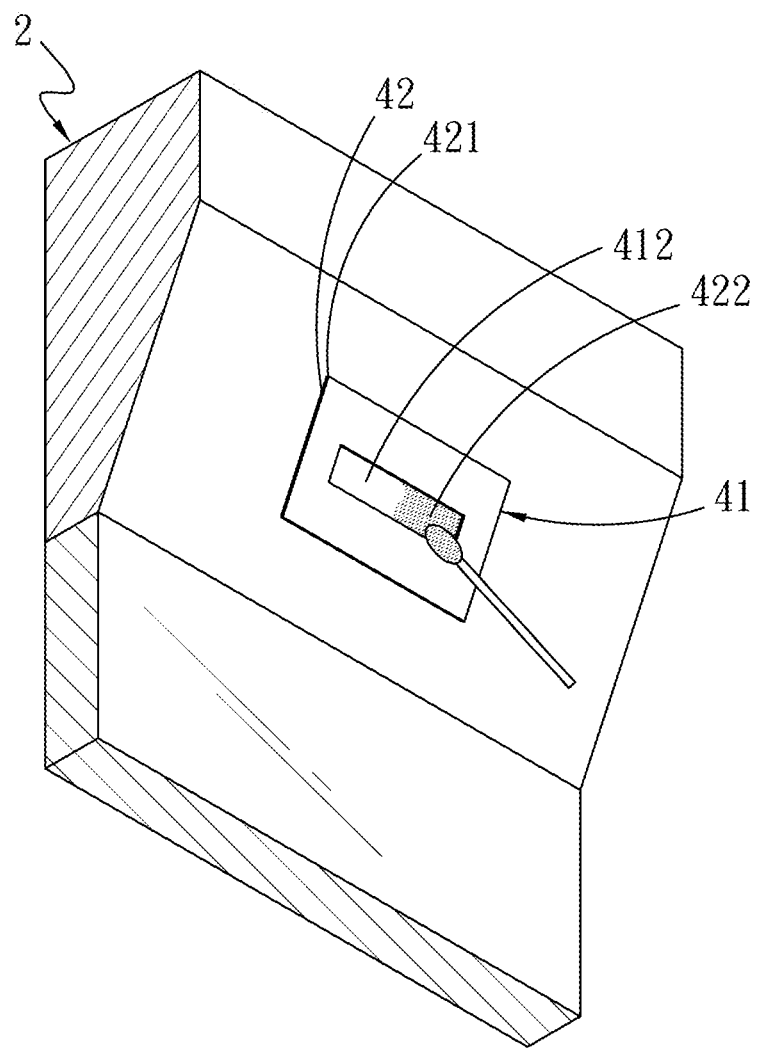
FIG. 3E is a diagram (5) of the mounting of the fastening structure of automobile sunshade of the present invention.
Figure 3F:
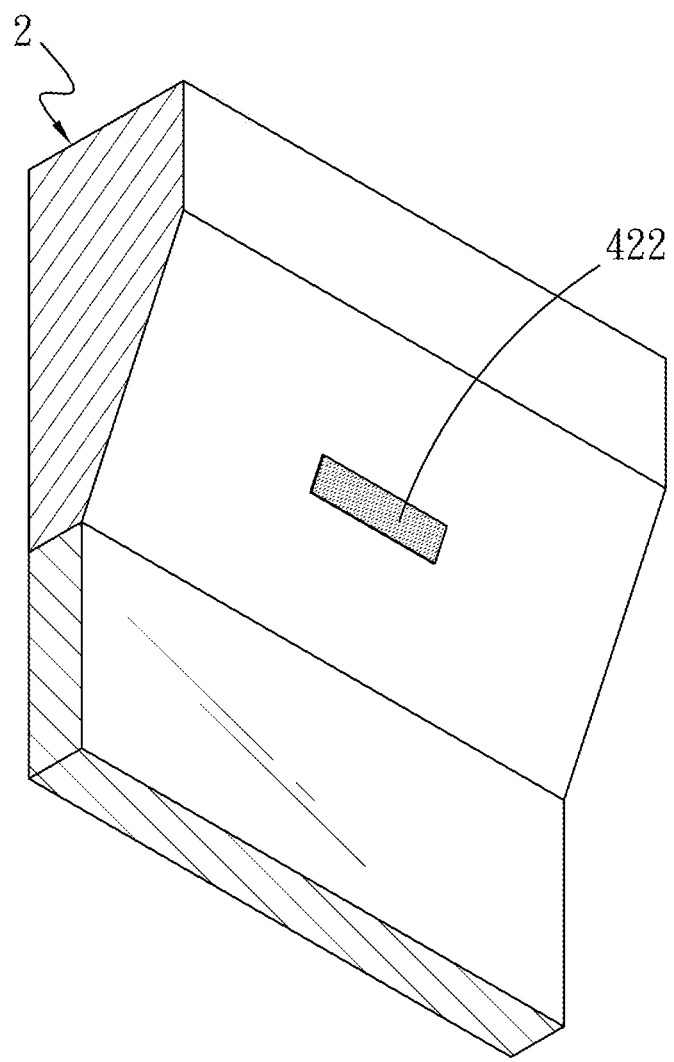
FIG. 3F is a diagram (6) of the mounting of the fastening structure of automobile sunshade of the present invention.
Figure 3G:
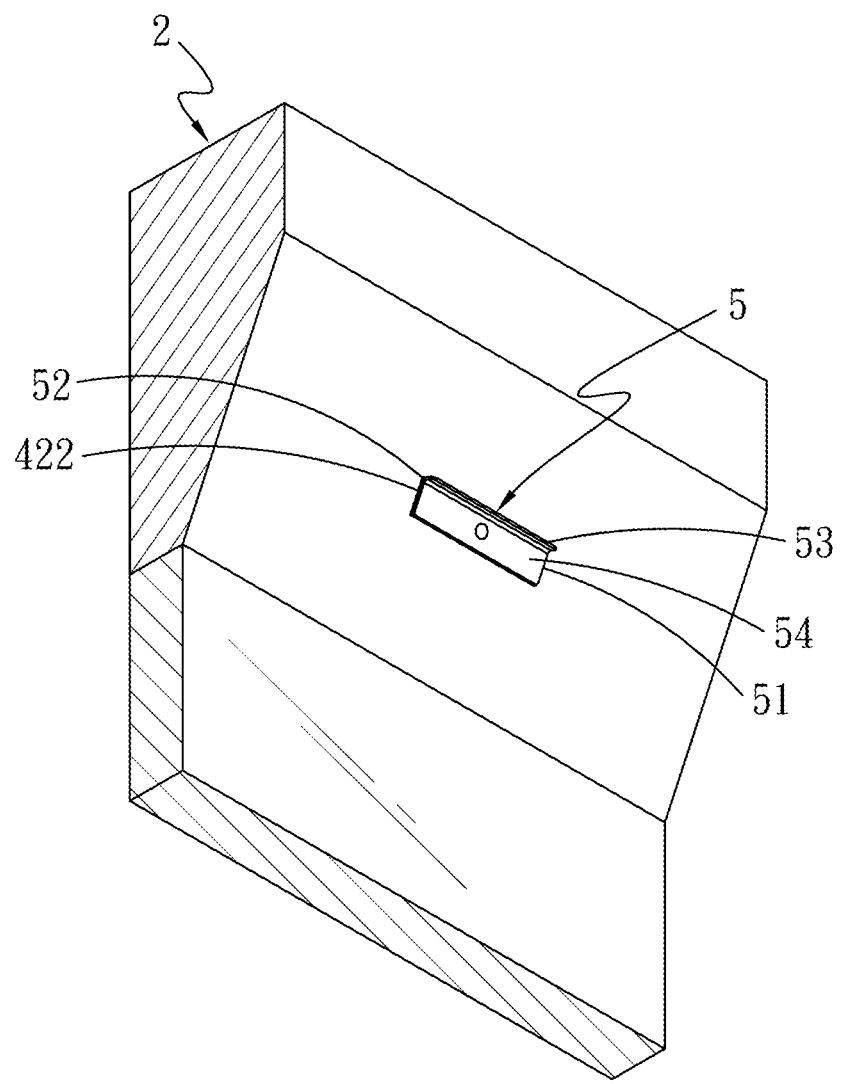
FIG. 3G is a diagram (7) of the mounting of the fastening structure of automobile sunshade of the present invention.

In this case, the method for mounting fastening structure of automobile sunshade 1 includes the steps as follows:

step A: providing at least one fixing strip 4, the fixing strip 4 being formed by stacking a first release layer 41, an adhesion layer 42, and a second release layer 43 in turn, the first release layer 41 having a torn portion 411, the adhesion layer 42 being provided on one side thereof along the second release layer 43 with a sticking layer 421;

step B: tearing off the torn portion 411 of the first release layer 41 to form a reserved opening 412 exposing the adhesion layer 42 (as shown in FIG. 3A);

step C: providing at least one positioning unit 5 located at the internal window frame 2, the positioning unit 5 having a main body 51 towards the reserved opening 412 in the corresponding position, a double-sided tape 52 being located at the main body 51 and facing one side of the internal window frame 2, a stop 53 being connected to the main body 51 and reversely protruding from the internal window frame 2, and a positioning space 54 being located between the main body 51 and the stop 53 as well as opening up in the direction opposite to the internal window frame 2 to provide the automobile sunshade 3 to be located thereon, adhering the main body 51 of the positioning unit 5 to the adhesion layer 42 in the reserved opening 412 temporarily (as shown in FIG. 3B), and adjusting the relative position of the positioning unit 5 and the automobile sunshade 3 of the internal window frame 2 (as shown in FIG. 3C);

step D: removing the temporarily adhered positioning unit 5, exposing the sticking layer 421 after removing the second release layer 43, and then adhering the first release layer 41 and the adhesion layer 42 to the internal window frame 2 via the sticking layer 421 (as shown in FIG. 3D);

step E: spreading a crosslinking agent 422 to the adhesion layer 42 under the reserved opening 412 (as shown in FIG. 3E);

step F: tearing off the first release layer 41 and the adhesion layer 42 adhered to the internal window frame 2 (as shown in FIG. 3F); and step G: orientating the main body 51 of the positioning unit 5 toward the crosslinking agent 422 on the internal window frame 2 correspondingly, and tearing off a release sheet 521 of the double-sided tape 52 on one side of the main body 51, so as to enable the main body 51 of the positioning unit 5 and the crosslinking agent 422 on the internal window frame 2 to be adhered to each other (as shown in FIG. 3G).

Figure 4:
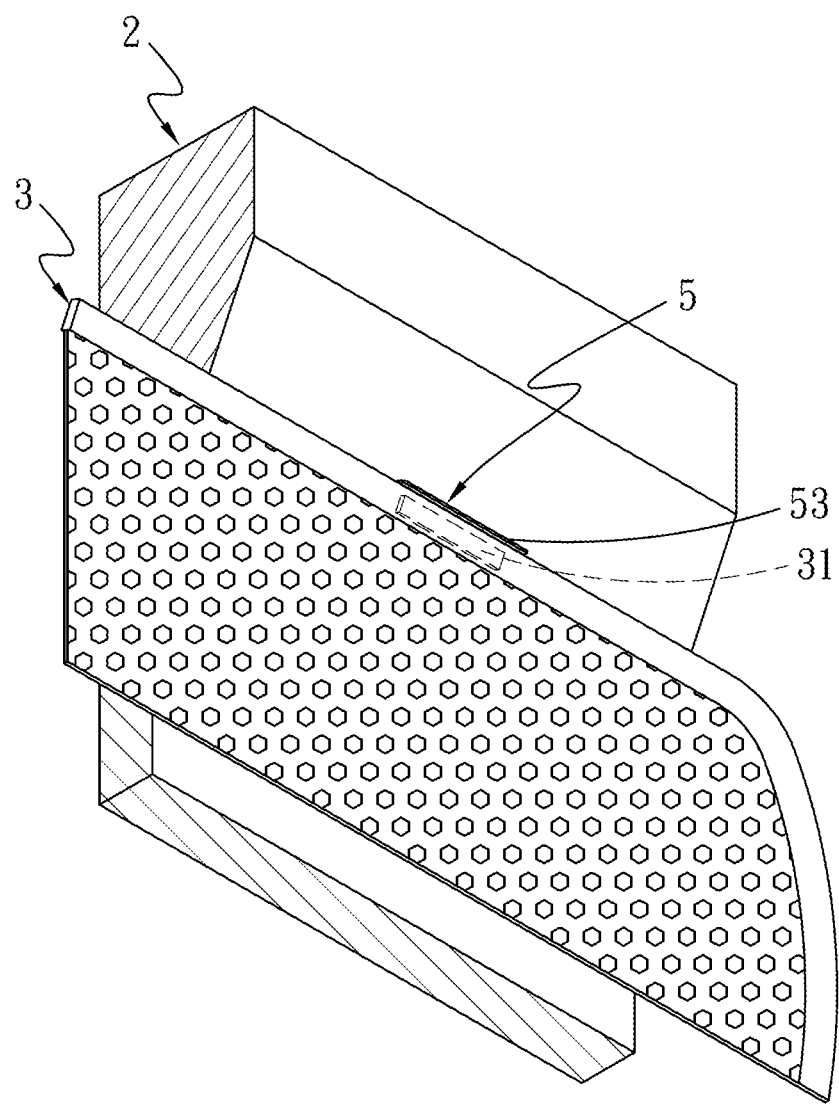
FIG. 4 is a diagram of the mounting of the fastening structure of automobile sunshade of the present invention together with the magnetizable internal window frame and the automobile sunshade.

For details, referring to FIGS. 2 and 4, the fixing strip 4 is used for bonding between the internal window frame 2 and the automobile sunshade 3, wherein the sticking layer 421 on one side of the adhesion layer 42 is combined with the second release layer 43, and the other side of the adhesion layer 42 is combined with the first release layer 41. Moreover, the first release layer 41 may be similar to the adhesion layer 42 in total area and in shape. The first release layer 41 is provided with the torn portion 411, which is in the form of rectangle in this embodiment, and the torn portion 411 is formed by a break line 4111 on the external perimeter thereof so as to facilitate forming the reserved opening 412 after the torn portion 411 is torn off. In addition, the adhesion layer 42 is exposed in the reserved opening 412 for providing the main body 51 of the positioning unit 5 to be adhered thereon temporarily. In the course of adhering the positioning unit 5 to the internal window frame 2, the main body 51 of the positioning unit 5 may be matched with at least one magnetic adsorbing part 31 on the external periphery of the automobile sunshade 3 in special design, correspondingly, so as to align and position. The second release layer 43 is larger than the first release layer 41 and the adhesion layer 42 in total area. Furthermore, the second release layer 43 is enlarged in this embodiment, so as to reduce trouble in positioning and the problem of deviation in adhesion, and then contribute to the increase in the yield rate of adhesion process indeed. It is convenient for the first release layer 41 and the sticking layer 421 on one side of the adhesion layer 42 to be stuck on the internal window frame 2 easily after the second release layer 43 is torn off.

The first release layer 41 used in the above embodiment is provided with a upper edge 413, a lower edge 414, and two side edges 415 respectively provided at two sides of the first release layer 41 as well as between the upper edge 413 and the lower edge 414. In the first release layer 41, moreover, the upper edge 413 is larger than or equal to the lower edge 414 in width, so as to facilitate aligning the interval between the internal window frame 2 and the window, and then prevent the window from being obstructed in opening or closing. In the practical design, however, the torn portion 411 is provided in the middle of the first release layer 41, and between the upper edge 413, the lower edge 414 and the side edges 415. In other words, the first release layer 41 may be designed in the form of rectangular configuration. Also, the adhesion layer 42 may be designed in the form of rectangular configuration as well. Additionally, it is described that the second release layer 43 is designed in shape to be larger than the rectangular configuration of the first release layer 41 and the adhesion layer 42. It is known from above that only the functions of adhesion, positioning and etc., are required, without the restriction on the shape for the fixing strip 4 and the torn portion 411 of the present invention.

More specifically, referring to FIGS. 2, 3A, 3B, 3C, 3D, 3E, 3F, and 3G, the torn portion 411 is added onto the first release layer 41 of the fixing strip 4 in the present invention. Firstly, the torn portion 411 is surrounded by the break line 4111 where is on the first release layer 41 of the fixing strip 4, and the reserved opening 412 is formed after the torn portion 411 is torn off, the adhesion layer 42 combined with the first release layer 41 is exposed in the location of the reserved opening 412, whereby the main body 51 of the positioning unit 5 is allowed to be adhered, in a direction toward the reserved opening 412, to the adhesion layer 42 temporarily, and the relative position is adjusted between the main body 51 and the automobile sunshade 3 of the internal window frame 2. After the temporarily adhered positioning unit 5 is detached and the second release layer 43 is removed, the sticking layer 421 is exposed so that the first release layer 41 and the adhesion layer 42 are adhered to the internal window frame 2. The crosslinking agent 422 is spread to the location of the reserved opening 412, where the adhesion layer 42 is exposed through a rod. Subsequently, the main body 51 of the positioning unit 5 is oriented toward the crosslinking agent 422 of the internal window frame 2 correspondingly after the first release layer 41 and the adhesion layer 42 are torn off. The release sheet 521 of the double-sided tape 52 on one side of the main body 51 is torn away. Finally, the main body 51 of the positioning unit 5 is joined to the crosslinking agent 422 on the internal window frame 2 by adhesion. The process of alignment and mounting of the automobile sunshade 3 to the internal window frame 2 is completed. In comparison with existing technology, the fixing strip 4 of the present invention formed by stacking the first release layer 41, the adhesion layer 42, and the second release layer 43 in turn, as well as the two existing problems of inconvenient operation and oblique attachment, caused by visual observation to predict the adhesive position before adhesion, are solved. Moreover, the fixing strip 4 is provided for positioning the positioning unit 5 as well as for positioning and fixing the automobile sunshade 3 upon adhesion, which is not only saving time and effort, but also effectively enhancing the quality of adhesion. Further, the yield rate of product is increased.

Next, referring to FIG. 2 and FIG. 4, the main body 51 and the stop 53 of the positioning unit 5 are provided on the internal window frame 2, the main body 51 and the stop 53 of the positioning unit 5 form 90 degrees therebetween in the present invention. Thereby, a supporting force for stopping the automobile sunshade 3 against the internal window frame 2 may be provided by the stop 53, when the automobile sunshade 3 is acted by external wind force, so that the automobile sunshade 3 is prevented from falling off due to action of wind force when the window of the internal window frame 2 is opened. Besides, for locating the positioning units 5 in a corresponding and distributed way so as to bear the weight of the automobile sunshade 3, the positioning units 5 are preferably provided at two ends or more positions on one side of the internal window frame 2 respectively. Moreover, in addition to accurately positioning the automobile sunshade 3 on the internal window frame 2 in a convenient way, the automobile sunshade 3 is prevented from being blown down by external wind force due to the stops 53 of the positioning units 5, so as to obtain superior windfall prevention and fixing effects, and then enable the automobile sunshade 3 to be provided on the internal window frame 2 stably.

Specifically, referring to FIG. 4, if the internal window frame 2 is a magnetizable frame border in the present invention, the positioning unit 5 is made of ferromagnetic material so as to be joined to the magnetic absorbing part 31 on the external periphery of the automobile sunshade 3 by magnetic attraction, in which the automobile sunshade 3 applied to the internal window frame 2. In another embodiment, referring to FIG. 5, if the internal window frame 2 is an unmagnetizable frame border, the positioning unit 5 is made of non-ferromagnetic material, the positioning unit 5 including an adhesive retaining structure 55 provided on the positioning space 54 so as to be joined to at least one adhesive retainer 32 on the external periphery of the automobile sunshade 3 by bonding, in which the automobile sunshade 3 applied to the internal window frame 2, the adhesive retaining structure 55 and the adhesive retainer 32 may be male or female adhesive retaining strip, relatively. Similarly, it is possible for the automobile sunshade 3 to achieve the sticking effect with respect to the internal window frame 2 and the automobile sunshade 3 is prevented from being blown down by external wind force. Superior windfall prevention and fixing effects may be obtained for the automobile sunshade 3 as well.

Figure 5:
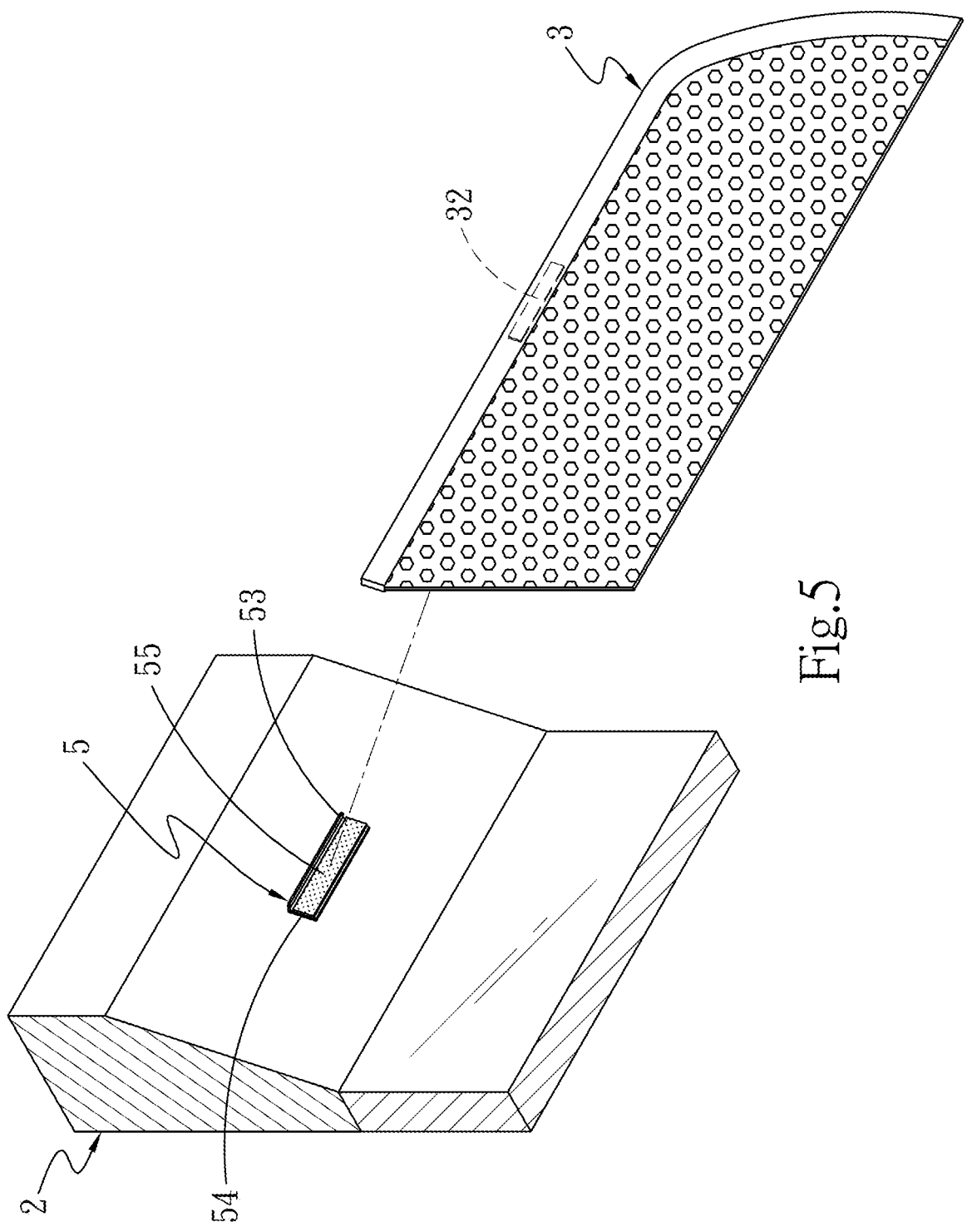
FIG. 5 is a diagram of the mounting of the fastening structure of automobile sunshade of the present invention together with the unmagnetizable internal window frame and the automobile sunshade.

Referring to FIGS. 4 and 5, the positioning unit 5 may be stuck on the magnetizable or unmagnetizable internal window frame 2 in accordance with the configuration of the fixing strip 4 and the positioning unit 5. It is convenient to adjust the relative position of the positioning unit 5 and the automobile sunshade 3 of the internal window frame 2 by the fixing strip 4 and the positioning unit 5, so as to avoid misalignment during adhesion. Thus, the automobile sunshade 3 is allowed for covering the windowpane above the door completely.

To sum up, the method for mounting fastening structure of automobile sunshade 1 of the present invention enables more accurately positioning when the positioning unit 5 is adhered to the internal window frame 2 by enlarging the second release layer 43 and adding the torn portion 411 of the first release layer 41, thereby the process of mounting and fastening the automobile sunshade 3 to the internal window frame 2 is completed, after the automobile sunshade 3 adsorbed or adhered to the internal window frame 2 through the configuration of the fixing strip 4 and the positioning unit 5. As described above, the fixing strip 4 of the present invention is capable to avoid misalignment during adhesion. In comparison with existing technology, the present invention is considerably advantageous in that not only saving time but also effectively enhancing the quality of adhesion and increasing the yield rate of product.

What is claimed is:

1. A method for mounting fastening structure of automobile sunshade, applied to an internal window frame having an automobile sunshade, comprising steps of:
   step A: providing at least one fixing strip, wherein said at least one fixing strip is formed by stacking a first release layer, an adhesion layer, and a second release layer in turn, said first release layer have a torn portion, and said adhesion layer is provided on one side thereof along said second release layer with a sticking layer;
   step B: tearing off said torn portion of said first release layer to form a reserved opening exposing said adhesion layer;
   step C: providing at least one positioning unit located at said internal window frame, wherein said positioning unit have a main body towards the reserved opening in a corresponding position, a double-sided tape located at said main body and facing one side of said internal window frame, a stop connected to said main body and reversely protruding from said internal window frame, and a positioning space located between said main body and said stop as well as opening up in a direction opposite to said internal window frame to provide said automobile sunshade to be located thereon, adhering said main body of said positioning unit to said adhesion layer in said reserved opening temporarily, and adjusting a relative position of said positioning unit and said automobile sunshade of said internal window frame;
   step D: detaching said temporarily adhered positioning unit, exposing said sticking layer after removing said second release layer, and then adhering said first release layer and said adhesion layer to said internal window frame via said sticking layer;
   step E: spreading a crosslinking agent to said adhesion layer in said reserved opening;
   step F: tearing off said first release layer and said adhesion layer adhered to said internal window frame; and
   step G: orientating said main body of said positioning unit toward said crosslinking agent on said internal window frame correspondingly, and tearing off a release sheet of said double-sided tape on one side of said main body, wherein said main body of said positioning unit is adhered to said crosslinking agent on said internal window frame.

2. The method for mounting fastening structure of automobile sunshade according to claim 1, wherein said first release layer is provided with a upper edge, a lower edge, and two side edges respectively provided at two sides of said first release layer as well as between said upper edge and said lower edge.

3. The method for mounting fastening structure of automobile sunshade according to claim 2, wherein said upper edge is larger than or equal to said lower edge of said first release layer in width.

4. The method for mounting fastening structure of automobile sunshade according to claim 2, wherein said torn portion is provided in the middle of said first release layer, and between said upper edge, said lower edge and said side edges.

5. The method for mounting fastening structure of automobile sunshade according to claim 1, wherein said second release layer is larger than each of said first release layer and said adhesion layer respectively, in total area.

6. The method for mounting fastening structure of automobile sunshade according to claim 5, wherein said first release layer is similar to said adhesion layer in total area and in shape.

7. The method for mounting fastening structure of automobile sunshade according to claim 1, wherein said positioning units are provided at two ends on one side of said internal window frame, respectively.

8. The method for mounting fastening structure of automobile sunshade according to claim 1, wherein said internal window frame is a magnetizable frame border, said positioning unit is made of ferromagnetic material so as to be joined to at least one magnetic absorbing part on an external periphery of said automobile sunshade by magnetic attraction, wherein the automobile sunshade applied to said internal window frame.

9. The method for mounting fastening structure of automobile sunshade according to claim 1, wherein said internal window frame is an unmagnetizable frame border, said positioning unit is made of non-ferromagnetic material, said positioning unit further including an adhesive retaining structure provided on said positioning space so as to be joined to at least one adhesive retainer on the external periphery of said automobile sunshade by bonding, wherein the automobile sunshade applied to said internal window frame, said adhesive retaining structure and said adhesive retainer may be male or female adhesive retaining strip, relatively.

10. The method for mounting fastening structure of automobile sunshade according to claim 1, wherein said main body and said stop of said positioning unit form 90 degrees therebetween.

\* \* \* \* \*